Patented Mar. 18, 1941

2,235,516

UNITED STATES PATENT OFFICE 2,235,516

PLASTIC SHEET MATERIAL AND PROCESS FOR MAKING THE SAME

Ralph T. K. Cornwell, Fredericksburg, Va., assignor to Sylvania Industrial Corporation, Fredericksburg, Va., a corporation of Virginia No Drawing. Application August 5, 1938,
Serial No. 223,223

12 Claims. (Cl. 91—68)

The invention relates to a method for modifying the surface of non-fibrous organic plastic sheet materials and to correlated improvements designed to reduce surface tackiness and adherence of such sheet materials so as to increase their durability and utility, and to the articles produced thereby.

There are in use for packaging merchandise and for other purposes, flexible sheet materials formed from non-fibrous, relatively plastic materials such, for example, as Cellophane, cellulose derivatives, chlorinated rubber, etc. These sheet materials are characteried by having a high gloss and transparency, a smooth surface and a relatively high degree of expansibility when stretched. When such sheet materials are rolled or stacked the air may be squeezed out between contiguous surfaces, so that the smooth surfaces stick together and can not be readily separated. The tendency of the contiguous smooth surfaces to stick together will be referred to hereinafter as "surface adherence."

To preserve and/or increase their flexibility and expansibility, it is customary to incorporate in such sheet materials an appropriate plasticizer. The amount of the plasticizer incorporated is usually the maximum amount compatible with retaining a suitable non-tacky surface. However, the amount of plasticizer depends, inter alia, on the season of the year and the atmospheric conditions, such as temperature and relative humidity under which the material is made, stored and used, the nature of plasticizer and thickness of the sheet material. The adhesive character of such materials may be inherent in the material or may be due to the presence of excess softener or plasticizer, and such characteristics will be referred to herein as "surface tackiness."

The variation in tackiness is wider in the case of plasticized hydrophilic colloidal materials, such as Cellophane, gelatine, etc., than in the case of plasticized hydrophobic colloidal materials, such as cellulose esters and resins, because the former are relatively hygroscopic substances. Since such hygroscopic materials are very susceptible to changes in the relative humidity of the ambient atmosphere, it has been customary heretofore to vary with the seasons of the year the amount of the plasticizer used in such sheet materials. Thus, for example, while Cellophane sheets plasticized with 12% glycerine, may exhibit no objectionable tackiness on a moderate day in spring, these sheets exhibit objectionable surface tackiness on a humid day in summer. On the other hand, on a cold and dry day in winter or fall of the year, these sheets containing 12% glycerine will be under-plasticized and will cause trouble in hand and machine wrapping because of brittleness and lack of expansibility. In view thereof, it is difficult if not impossible to use in summer a stock of hygroscopic sheet material which was prepared for use in winter.

The above mentioned variations in the flexibility and expansibility of non-fibrous, hydrophilic sheet materials give rise to numerous difficulties in the use of the materials. For example, brittleness on the one hand, or tackiness on the other will decrease the speed of manipulation of such materials in hand or machine wrapping, giving rise to inconvenience, waste and expense. Further, surface adherence of the smooth sheets also gives rise to difficulties when one attempts to remove sheets singly from a stack of sheets, as by the use of suction. If the sheets are unduly tacky and/or adherent it is found that more than one sheet is withdrawn thus necessitating rewrapping or otherwise needlessly wasting the wrapping material.

Further, in certain applications, the sheet materials must be rolled and to achieve economy this must be done rapidly and under considerable tension, so that frequently the air is squeezed out between contiguous layers which then adhere to each other as if they were glued and form hard spots in the roll. The smoother the sheet and the greater the quantity of hygroscopic plasticizer present, the greater becomes this adhesion.

Previous attempts to overcome the tackiness and reduce the surface adherence of plasticized transparent non-fibrous sheet materials have been unsatisfactory for the reasons that either the transparency of the materials has been diminished or the chemical properties of the surface have been altered. Previous proposals to reduce surface adherence by dusting the surfaces with inorganic mineral powders results frequently in staining the sheet material, scratching the surface or reducing the transparency. It has been proposed to overcome tackiness to coat the surface of the sheet materials with a continuous coating of a non-tacky composition, but this usually alters radically the chemical properties of the surface. For example, tacky Cellophane may be rendered non-tacky by covering the surface with a continuous lacquer coating, but the sheet then can no longer be used with water-soluble adhesives and can only be printed with lacquer inks or oil-containing inks. Such coated sheets must, for practical purposes, be considered as organic cellulose ester sheets, which is a disadvantage for many commercial applications.

It is a general object of the invention to overcome the foregoing disadvantages and difficulties and to modify the surface characteristics of non-fibrous, flexible sheets and pellicles made of a hydrophilic colloid so as to permit the use of a wider range of plasticizer and/or softening agent in such sheets so as to obtain a maximum flexibility and expansibility under stretching with a minimum of tackiness and stickiness when stacked or rolled.

It is a further object of the invention to provide an improved process for treating non-fibrous, flexible sheets and pellicles made of a hydrophilic colloidal material whereby there may be incorporated in the material a quantity of plasticizer and/or softening agent, substantially in excess of that normally present in said materials while, at the same time, obtaining a material less tacky than said normally plasticized materials.

It is a specific object of the invention to provide a process for treating non-fibrous, flexible sheets of hydrophilic colloidal materials whereby to decrease the tendency of contiguous surfaces to stick together and adhere, and to decrease the slipperiness of the surface to facilitate the winding up of the material into rolls and subsequent unrolling.

It is a specific object of the invention to render non-tacky an over-plasticized transparent sheet of hydrophilic colloidal material without detracting from the transparency and smoothness thereof, and without modifying the chemical properties of the material, so that the sheet may be united to itself or other materials with water-soluble adhesives and printed with inks adapted for printing the untreated sheet material.

Other objects of the invention will in part be obvious and will in part appear hereinafter.

In the practice of the invention, a plasticized pellicle made of a hydrophilic colloidal material may be rendered less tacky or maintained non-tacky by depositing on one or both surfaces a multiplicity of fine particles of an anti-sticking composition comprising a solid hydrophobic fatty substance. Suitable solid fatty substances comprise fatty alcohols, fatty ketones, fatty amides, fatty acids, fatty acid anhydrides, inorganic salts of fatty acids and esters of fatty acids with monhydric alcohols. The fatty substance may be used alone but is used preferably in admixture with a hydrophobic organic substance which reduces the greasiness and increases the hardness of the fatty substance.

Thus there may be produced a flexible but non-tacky pellicle of a hydrophilic colloidal material by treating the pellicle, preferably in the gel state, with a water soluble plasticizer in an amount in excess of that which can be tolerated in a commercially dried product without obtaining a tacky surface when prepared according to the prior art above mentioned. Preferably after drying the plasticized pellicle is treated with a non-aqueous dispersion of a solid hydrophobic anti-sticking composition comprising a solid hydrophobic fatty substance dispersed in a liquid which wets the pellicle and the liquid is then evaporated to deposit the anti-sticking composition in the form of separate particles over the surface of the pellicle. Since the dispersion media is one which will uniformly wet the hydrophilic sheet material, the anti-sticking agent will be uniformly distributed over the surface, but since the anti-sticking agent is hydrophobic, it will roll up in the form of separate granules upon evaporation of the solvent and will not form a continuous surface coating. The quantity of the particles of fatty substance or of the mixture of the fatty substance and hardening agent used is insufficient to form a continuous surface layer or coating, but sufficient to prevent any appreciable adhesion of contiguous treated surfaces.

The invention accordingly comprises the several steps and the relation of one or more of such steps with respect to each of the others, and the product possessing the features, properties and the relation of elements which are exemplified in the following detailed disclosure, and the scope of the application which will be indicated in the claims.

The process is applicable for treating various types of sheets and pellicles formed of organic hydrophilic colloidal materials such, for example, as cellulose hydrate of all kinds, alkyl and oxy-alkyl cellulose ethers which are soluble in water or in aqueous alkalies, gelatine, casein and the like; the cellulose hydrate may be derived from the deesterification of cellulose esters or by precipitation of cellulose from viscose solutions or from solutions of cellulose in inorganic solvents such as zinc chloride, cuprammonia, alkali metal thiocyanates and the like, or in organic solvents such as quaternary ammonium hydroxides, in particular a benzylalkyl ammonium hydroxide.

The pellicle of organic hydrophilic colloidal material may be plasticized with any suitable water soluble, preferably hygroscopic, plasticizer such as polyhydric alcohols for example glycerol, diethylene glycol, glucose, and water soluble organic nitrogen compounds for example triethanolamine, carbamide, and salts and esters of organic nitrogen compounds for example tetra-alkylammonium phosphates, methyl amine laurate, and the like, or suitable combinations of such softening agents with each other and with water.

Among the fatty substances which may be used as anti-sticking agents, the following may be given as examples, but the invention is not limited to such substances: fatty acids of not less than 11 carbon atoms in the aliphatic radical, such, for example, as myristic, palmitic, stearic, arachidic, etc.; water-insoluble solid salts of such higher fatty acids with alkaline earth metals, aluminum, magnesium and zinc, etc., such, for example, as barium stearate, calcium oleate, magnesium palmitate, etc.; solid organic esters of such higher fatty acids with mono- and poly-hydric alcohols, for example, methyl arachidate, ethyl lignocerate, glycol mono-palmitate, etc.; also derivatives of such higher fatty acids such as, the fatty amides, for example, oleamide, stearamide, etc., fatty acid anhydrides, for example, myristic anhydride, stearyl anhydride, etc., fatty alcohols such, for example, as heptadecanol, $C_{17}H_{35}OH$, etc.; fatty ketones such, for example, as heptadecanone.

As hardening agents for the fatty substances there may be employed a solid organic compound which is compatible, preferably soluble in the fatty compound, for example, a wax such as, carnauba wax, candelilla wax, etc.; a cellulose ether, such as methyl cellulose, ethyl cellulose, benzyl cellulose; a cellulose ester such as, cellulose acetate, cellulose nitrate, etc.; a resin, either natural or synthetic, for example, gum dammar, zinc resinate, coumarin resins, glyptal resins and toluene sulfonamide-aldehyde resins; also esters of the higher fatty acids with an aromatic nitrogen base such as aniline, naphthalene bases, aromatic diamines, etc., but the invention is not limited to such hardening agents. The fatty substance comprises the major portion of the mixture and the hardening agent, the minor proportion, a suitable ratio being from 1 to 0.1 to 0.5.

The particles of fatty compounds may be deposited on the surface during or after manufacture and/or after the sheet material has become stuck together, by any suitable method which achieves a uniform distribution of the particles. For example, the fatty compound in a comminuted state may be sprayed on the sheet material by means of a stream of air; the fatty substance may be melted and sprayed by air which breaks it up into fine particles or, the fatty compound may be dispersed in a readily volatile liquid or solvent and the fluid mixture sprayed on the sheet material in a manner such as to deposit the fatty substance in the form of a multiplicity of fine particles, but not as a continuous coating. Preferably, the sheet may be passed through a very dilute solution comprising a hydrophobic fatty compound in a solvent which wets readily the sheet material. The solvent is evaporated so as to leave the fatty compound distributed as a multiplicity of separate particles, care being taken, by employing a sufficiently dilute solution, to avoid formation of a continuous surface coating.

The invention also contemplates the treatment of a stack of sheets of non-fibrous organic plastic material which have stuck together due to excessive tackiness and/or surface adherence. An edge of the stack of sheets may be disposed in a strong air current carrying particles of the comminuted anti-sticking fatty substance with or without a hardening agent. The air stream separates the individual sheets one from another and deposits on their surfaces a multiplicity of particles of the anti-sticking agent which effectively prevents the sheets from sticking together again.

The invention contemplates the use of the fatty anti-sticking substance in the form of dispersions, emulsions, suspensions, true solutions and/or colloidal solutions. The dispersion liquids are to be selected from compounds which are volatile at relatively low temperatures such as 60° C. to 80° C. and which are non-solvents of the plasticizer used in the sheet material and which wet the surface of the sheet material without swelling it. For regenerated cellulose sheets and pellicles plasticized with glycerine, suitable dispersion liquids are mixtures of organic liquids such as, toluene, benzene, xylol, etc., with an alcohol, ester, ketone, etc. in an amount sufficient to cause the mixture to wet the pellicle.

In the present process it has been found that only an extremely small quantity of the anti-sticking agent need be employed, because unlike the practice of the prior art, the present process deposits the agent in the form of a multiplicity of individual separate particles irregularly disposed on the surface at widely separated points and not in the form of a continuous surface coating or layer. The weight of the anti-sticking agent to the weight of the dry product is preferably less than 0.05% and usually is much less than this percentage. For example, one pound of a solid mixture of 80% triple-pressed stearic acid and 20% ethyl cellulose, as above employed, is sufficient for rendering non-tacky and slip-free both surfaces of about 2,500 pounds of No. 300 sheet cellulose hydrate, plasticized with 20% to 23% of glycerine and from 8% to 9% water.

By way of illustrating, but not by way of limiting the scope of the invention, there will be given the following example:

A sheet of cellulose hydrate having a thickness of about 0.0012 of an inch is treated with an aqueous solution of glycerine and dried so as to contain from 18% to 20% of glycerine and from 7% to 9%, by weight, of moisture. The dry sheet is passed through a bath comprising 80 parts of triple-pressed stearic acid, 20 parts of high viscosity ethyl cellulose dissolved in a solvent mixture comprising 80 parts of ethyl alcohol and 20 parts of toluene, the mixture of stearic acid and ethyl cellulose comprising 0.2%, by weight, of the solution. The excess solution is removed from the surfaces by passing the sheet through wiping rolls and the treated sheet is dried at a temperature below the melting point of the anti-sticking agent, whereupon the mixture of stearic acid and ethyl cellulose is deposited on the sheet as a multiplicity of separate fine particles substantialy uniformly distributed over the surface. The treated sheet is characterized by having substantially the same transparency, gloss and smoothness to the touch as before treatment, and is further characterized by a non-tacky surface and good surface slip, so that the treated product may be rolled or stacked without caking, and individual sheets may be freely separated from a stack thereof.

When the anti-sticking agent is applied to the sheet by means of a solvent, the evaporation of the solvent usually causes a loss in the moisture content of the base sheet. To prevent excessive drying out of the sheet when thus treated, the sheet may be conditioned by prehumidification or post humidification with water vapor in a known manner. Alternatively and preferably, the sheet material is treated with the solution of the anti-sticking agent while the sheet is in the gel state, i. e. while it contains an excess of water over that present in the commercially dried product and the excess water is simultaneously evaporated during the evaporation of the solvent of the anti-sticking agent.

The product of the present invention is characterized by the following features: The transparency is substantially unimpaired because the particles of the anti-sticking agent are practically invisible. The treated sheet wets instantly with water so that labels having an aqueous adhesive may be applied to the treated sheet and will adhere without difficulty. The treated sheet may be printed or dyed with aqueous solutions without the necessity of employing any special printing or dyeing procedure over that employed for the untreated sheet. The moisture permeability remains substantially the same as that of the untreated sheet.

The decreased slipperiness enables the treated material to be wound up in rolls less tightly than the untreated material, thereby preventing the formation of uneven pressure areas, especially the so-called "hard spots" in the roll and its permits rapid and uniform slitting of the treated sheet and very narrow widths of the material to be reeled into rolls of large diameters without the danger of telescoping.

The decreased slipperiness of the material is, further, in apparent contradiction to another remarkable characteristic of the treated material, which is its nontackiness. In consequence of the substantial reduction of the tackiness of the surface, the treated material may be rolled and/or cut and stacked without the sheets sticking together. Moreover, since the comminuted material is by nature relatively soft and plastic, the particles thereof do not damage the blades of the apparatus used for sheeting and slitting the sheet materials. What is more important, the decreased tackiness permits the incorporation of an amount of plasticizer and/or softening agent in excess of that normally present in a particular material, resulting in a stronger material which retains its flexibility for longer periods of time. For example, by the present process from 40% to 80% more plasticizer, and from 20% to 30% more water may be incorporated in a sheet of cellulose hydrate than the maximum permissible in the same sheet before treatment. Single sheets of the treated material may be easily and rapidly removed from a stack, which greatly facilitates manipulation thereof by hand or by automatic feed devices in wrapping machines and the like.

It appears probable that the various novel characteristics exhibited by the treated material may be ascribed in part to the presence of the particles which decrease the adherence by preventing the direct contact of large uninterrupted surface areas.

Since certain changes in carrying out the above process, and certain modifications in the article which embodies the invention may be made without departing from its scope, it is intended that all matter contained in the above description shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. In a process for making a flexible non-tacky pellicle of hydrophilic colloidal material, the steps comprising incorporating in said pellicle a water soluble plasticizer in an amount in excess of that which can be tolerated in a commercially dried product without obtaining a tacky surface, and treating said plasticized pellicle with a non-aqueous dispersion of a hydrophobic anti-sticking composition comprising a normally solid hydroprobic fatty substance and a hardening agent for said fatty substance dispersed in a liquid which wets the pellicle, the quantities of said fatty substance and hardening agent in the liquid being insufficient to form a continuous coating over the pellicle upon evaporation of the liquid and evaporating the liquid to deposit the anti-sticking composition in the form of separate particles substantially uniformly distributed over the surface of said pellicle in an amount less than .05% by weight of said pellicle to prevent any appreciable adhesion of contiguous treated surfaces.

2. A process for rendering less tacky a plasticized pellicle formed of a hydrophilic colloidal material comprising treating said pellicle with a non-aqueous dispersion of a hydrophobic anti-sticking composition comprising a normally solid hydrophobic fatty substance and a hardening agent for said fatty substance dispersed in a liquid which wets the pellicle, the quantities of said fatty substance and hardening agent in the liquid being insufficient to form a continuous coating over the pellicle upon evaporation of the liquid and evaporating the liquid to deposit the anti-sticking composition in the form of separate particles substantially uniformly distributed over the surface of said pellicle in an amount less than .05% by weight of said pellicle to prevent any appreciable adhesion of contiguous treated surfaces.

3. A process for rendering less tacky a plasticized pellicle formed of a hydrophilic colloidal material comprising treating said pellicle with a non-aqueous dispersion of a hydrophobic anti-sticking composition comprising a normally solid hydrophobic fatty substance and a hardening agent for said fatty substance dispersed in a liquid which wets the pellicle, the quantities of said fatty substance and hardening agent in the liquid being insufficient to form a continuous coating over the pellicle upon evaporation of the liquid and evaporating the liquid to deposit the anti-sticking composition in the form of separate particles substantially uniformly distributed over the surface of said pellicle to prevent any appreciable adhesion of contiguous treated surfaces.

4. A process of rendering less tacky a plasticized pellicle formed of a hydrophilic colloidal material comprising treating said pellicle with a non-aqueous dispersion of a hydrophobic anti-sticking composition comprising a normally solid hydrophobic fatty substance dispersed in a liquid which wets the pellicle, the quantity of said fatty substance in the liquid being insufficient to form a continuous coating over the pellicle upon evaporation of the liquid, and evaporating the liquid to deposit the anti-sticking composition in the form of substantially permanent, separate particles uniformly distributed over the surface of said pellicle to prevent any appreciable adhesion of contiguous treated surfaces.

5. A process for rendering less tacky a plasticized pellicle formed of a hydrophilic colloidal material comprising distributing over the surface of said pellicle, in an insufficient amount to form a continuous coating, a multiplicity of fine, substantially permanent particles of an anti-sticking composition comprising a normally solid hydrophobic fatty substance containing not less than 11 carbon atoms in the aliphatic radical and a cellulose ether.

6. A process for rendering less tacky a plasticized pellicle formed of a hydrophilic colloidal material comprising distributing over the surface of said pellicle, in an insufficient amount to form a continuous coating, a multiplicity of fine, substantially permanent particles of an anti-sticking composition comprising a major portion of a normally solid hydrophobic fatty substance containing not less than 11 carbon atoms in the aliphatic radical and a minor portion of an agent which hardens the fatty substance by reducing its greasiness.

7. A process for producing a non-tacky, water-wettable, plasticized pellicle comprising substantially uniformly distributing over the surface of a plasticized hydrophilic colloidal pellicle, in an insufficient amount to form a continuous coating, a multiplicity of fine, substantially permanent particles of an anti-sticking composition comprising a normally solid hydrophobic fatty substance containing not less than 11 carbon atoms in the aliphatic radical.

8. As an article of manufacture, a plasticized pellicle formed of a hydrophilic colloidal material carrying on its surface a multiplicity of fine, solid and substantially permanent particles of an anti-sticking composition comprising a mixture of a fatty substance containing not less than 11 carbon atoms in the aliphatic radical and an agent which hardens the fatty substance by reducing its greasiness, the particles being present in an insufficient amount to form a continuous coating but sufficient to prevent appreciable adhesion of contacting surfaces when such pellicles are stacked.

9. As an article of manufacture, a plasticized, water-wettable pellicle formed of a hydrophilic colloidal material carrying on its surface a multiplicity of fine, solid and substantially permanent particles of a hydrophobic fatty substance containing not less than 11 carbon atoms in the aliphatic radical, said substance being present in an insufficient amount to form a continuous surface coating but sufficient to prevent any appreciable adhesion between the contacting surfaces when such pellicles are stacked.

10. As an article of manufacture, a plasticized water-wettable pellicle formed of a hydrophilic colloidal material containing 18 to 22 per cent by weight of a hygroscopic plasticizing agent and carrying on its surface a multiplicity of fine, solid and substantially permanent particles of a hydrophobic fatty substance containing not less than 11 carbon atoms in the aliphatic radical, said substance being present in an insufficient amount to form a continuous coating.

11. As an article of manufacture, a plasticized pellicle formed of cellulose hydrate and carrying on its surface a multiplicity of fine, solid and substantially permanent particles of an anti-sticking composition comprising a mixture of a normally solid hydrophobic fatty substance containing not less than 11 carbon atoms in the aliphatic radical and a cellulose ether.

12. As an article of manufacture, a plasticized pellicle formed of cellulose hydrate and carrying on its surface a multiplicity of fine, solid and substantially permanent particles of an anti-sticking composition comprising a mixture of a normally solid fatty acid and ethyl cellulose ether.

RALPH T. K. CORNWELL.